(12) United States Patent
Dejima et al.

(10) Patent No.: US 8,300,175 B2
(45) Date of Patent: Oct. 30, 2012

(54) LIGHTING DEVICE HAVING REFLECTING PARTS AND LIQUID CRYSTAL DISPLAY DEVICE USING THE SAME

(75) Inventors: Norihiro Dejima, Chiba (JP); Makoto Kurihara, Chiba (JP)

(73) Assignee: Seiko Instruments Inc. (JP)

( * ) Notice: Subject to any disclaimer, the term of this patent is extended or adjusted under 35 U.S.C. 154(b) by 812 days.

(21) Appl. No.: 12/321,618

(22) Filed: Jan. 23, 2009

(65) Prior Publication Data
US 2009/0190069 A1 Jul. 30, 2009

(30) Foreign Application Priority Data
Jan. 25, 2008 (JP) ................................. 2008-014690

(51) Int. Cl.
G02F 1/1335 (2006.01)
F21V 7/04 (2006.01)
(52) U.S. Cl. ............. 349/65; 349/64; 362/625; 362/626
(58) Field of Classification Search .................... 349/65, 349/64; 362/619, 620, 625, 626
See application file for complete search history.

(56) References Cited

U.S. PATENT DOCUMENTS
6,454,452 B1 * 9/2002 Sasagawa et al. ............. 362/561
2003/0090888 A1 * 5/2003 Mizutani et al. ............... 362/31
2004/0022050 A1 * 2/2004 Yamashita et al. ............. 362/31
2007/0035680 A1 * 2/2007 Watanuki et al. ............... 349/61

FOREIGN PATENT DOCUMENTS
JP 05216030 8/1993
JP 08286037 11/1996
JP 11250714 9/1999

OTHER PUBLICATIONS
Patent Abstracts of Japan, publication No. 01-152406, publication date, Jun. 14, 1989.

* cited by examiner

Primary Examiner — Michael Caley
(74) Attorney, Agent, or Firm — Adams & Wilks

(57) ABSTRACT

A lighting device has a light source, a light guiding plate having first and second opposite main surfaces, and a reflector confronting the second main surface of the light guiding plate. The light guiding plate has a light entrance part that introduces light from the light source into the light guiding plate and reflecting parts formed on one of the first and second main surfaces for reflecting light introduced into the light guiding plate toward the first main surface. The reflecting parts are arranged on respective sets of arcs of concentric circles with each concentric circle having the light entrance part as its center. Each of the reflecting parts has a long axis extending in a direction substantially orthogonal to a line connected between a center of the corresponding reflecting part and the center of the light entrance part.

20 Claims, 8 Drawing Sheets

LIGHTING DEVICE HAVING REFLECTING PARTS AND LIQUID CRYSTAL DISPLAY DEVICE USING THE SAME

BACKGROUND OF THE INVENTION

1. Field of the Invention

The present invention relates to a lighting device that has a planar light emitting face, and to a liquid crystal display device using this lighting device.

2. Description of the Related Art

Liquid crystal displays are widely used in portable devices such as notebook personal computers, cellular phones, PDAs, and electronic dictionaries. Liquid crystal displays need to place a planar lighting device behind a liquid crystal panel because the liquid crystal panel is not self-luminous. Lighting devices for portable devices are required to be thin and, at the same time, to have high luminance to make a displayed image viewable outdoors during daylight hours. Uniform light emission is also requested of lighting devices for portable devices so that a displayed image has an even brightness. As a prospective solution, sidelight type lighting devices are beginning to be researched. Sidelight type lighting devices which have a light source placed by the light emission face can be made thin overall (see JP 11-250714 A and JP 11-232918 A, for example).

FIG. 12 is a schematic vertical sectional view of this type of known conventional lighting device 50. FIG. 13 is a schematic top view of the lighting device 50. The lighting device 50 includes a light source 53, a light guiding plate 51, and a reflecting plate 54. The light source 53 is placed to the side of the light guiding plate 51, and light from the light source 53 is introduced into the light guiding plate 51. A face of the light guiding plate 51 that is opposed to a light exit face of the light guiding plate 51 (hereinafter referred to as opposed face) has a plurality of reflecting parts 52 formed in, for example, V-shaped grooves. Light trapped between the light exit face and opposed face of the light guiding plate 51 is reflected by the slopes of the V-shaped grooves of the reflecting parts 52. In short, the slopes function as reflecting surfaces. The slopes of the V-shaped grooves are set suitably so that light trapped within the light guiding plate 51 is taken out from the light exit face of the light guiding plate 51. The reflecting plate 54 reflects light that has leaked from the opposed face of the light guiding plate 51 back to the light guiding plate 51, thereby preventing the intensity of illumination light taken out from the top face of the light guiding plate 51 from lowering.

As illustrated in FIG. 13, a large number of reflecting parts 52 are arranged in arc pattern with the light source 53 as the center of the arc. The V-shaped grooves of the reflecting parts 52 have, when viewed from above, a rectangular shape, and are formed such that the longitudinal direction of the rectangle is substantially at right angles with the direction of the light source 53. Arranging the reflecting parts 52 in this manner causes reflected light that is reflected at the reflecting surfaces of the V-shaped grooves to converge in a direction perpendicular to the light exit face of the light guiding plate 51. With the reflected light thus directed in the perpendicular direction, a device to which the lighting device 50 is applied, for example, a liquid crystal display device, can display bright images.

FIG. 14 is a partial sectional view of the light guiding plate 51. The reflecting parts 52 in the form of V-shaped grooves are formed on the opposed face of the light guiding plate 51. Incident light 57b which enters from the direction of the light source 53 is reflected upward by a reflecting part 52a, which is positioned on the near side of the incident light 57b. However, when the reflecting parts 52 are arranged as illustrated in FIG. 13, a reflecting part 52b, which is positioned behind the reflecting part 52a with respect to the incident light 57b, is in the shadow of the reflecting part 52a. This causes unevenness in luminance of illumination light that exits from the light exit face of the light guiding plate 51 and, as a result, the obtained illumination light does not have a uniform intensity.

SUMMARY OF THE INVENTION

A lighting device according to the present invention includes: a light source; a light guiding plate; and a reflector. At least one of a light exit face and an opposed face of the light guiding plate is provided with a plurality of reflecting parts, which cause light emitted from the light source and introduced from a light entrance part of the light guiding plate to exit to outside. The plurality of reflecting parts include concave parts, and one of arranged in arc pattern with the light entrance part as a center of an arc and formed as rectangles having long axes being in a direction substantially orthogonal to a direction in which the light entrance part is located. The plurality of reflecting parts are also arranged in staggered pattern in a circumferential direction of a circle having the light entrance part at its center, and in a radius direction which is orthogonal to the circumferential direction. With this structure, a reflecting surface of one of the plurality of reflecting parts that is positioned in a back is prevented from falling in a shadow of another one of the plurality of reflecting parts that is positioned nearer to the light source, and hence incident light is reflected in a wide area. Illumination light exiting the light exit face of the light guiding plate is therefore uniform with little unevenness in luminance.

Reflecting parts that are adjacent to each other in the radius direction are arranged so as to make the adjacent reflecting parts partially overlap with each other in the radius direction. This prevents dark lines, which occur in areas where adjacent reflecting parts do not overlap with each other.

Alternatively, the plurality of reflecting parts are arranged so that the long axis of the each of the plurality of reflecting parts that is positioned within a given distance from the light entrance part is set randomly within a range of from 0.8 times to 1.2 times a reference length, which is determined based on the distance. With this structure, illumination light exiting the light exit face of the light guiding plate is uniform with little unevenness in luminance.

An area of the reflecting surface of the each of the plurality of reflecting parts increases as a distance from the light entrance part to the each of the plurality of reflecting parts becomes greater. This compensates for the weakening of light introduced from the light entrance part, which is observed as the distance from the light entrance part becomes greater.

The same effect can be obtained by making a total area of the reflecting surfaces per unit area of at least the one of the light exit face and the opposed face of the light guiding plate larger as the distance from the light entrance part to the each of the plurality of reflecting parts becomes greater.

The light entrance part includes a substantially semi-circular recess in a side face of the light guiding plate that faces the light source. This reduces adverse effects of refraction when light enters the light guiding plate, thereby diffusing the light in the interior of the light guiding plate.

A liquid crystal display device according to the present invention includes a liquid crystal panel positioned to face the light exit face.

DETAILED DESCRIPTION OF THE PREFERRED EMBODIMENTS

A lighting device of the present invention includes a light source, a light guiding plate, and a reflector. The light guiding plate includes a light entrance part, which introduces light of the light source to the interior of the light guiding plate, a light exit face, through which guided light exits, and an opposed face, which is opposed to the light exit face. A plurality of reflecting parts which cause the introduced light to exit to the outside are formed on at least one of the light exit face and opposed face of the light guiding plate. The reflecting parts are arranged in staggered pattern in the circumferential direction of a circle having the light entrance part at its center, and in a radius direction which is orthogonal to the circumferential direction. In this way, reflecting surfaces of the reflecting parts are irradiated with incident light over a wide area, which makes illumination light that exits the light exit face of the light guiding plate uniform with little unevenness in luminance.

A concrete description of the present invention is given below with reference to the drawings.

First Embodiment

Figure 1A:
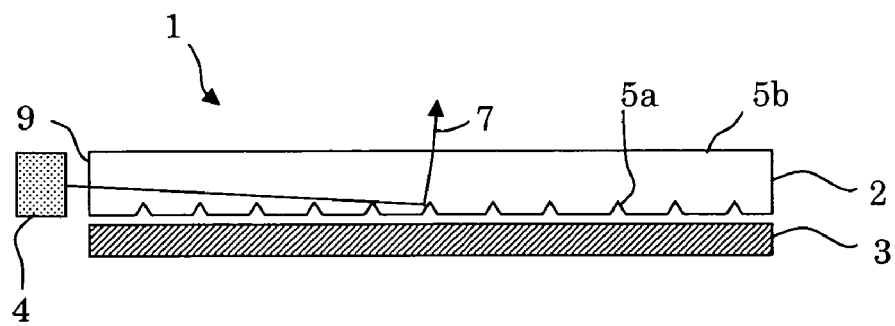
FIGS. 1A to 1C are explanatory diagrams illustrating a lighting device according to an embodiment of the present invention.
Figure 1B:
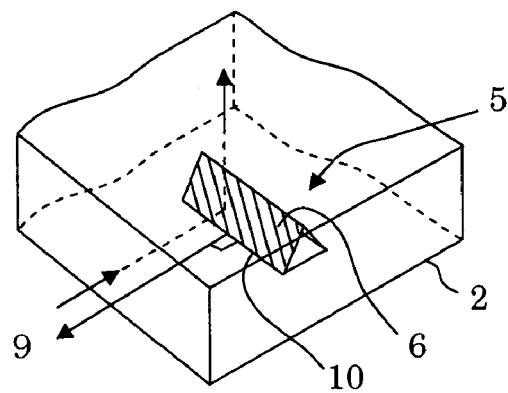
Figure 1C:
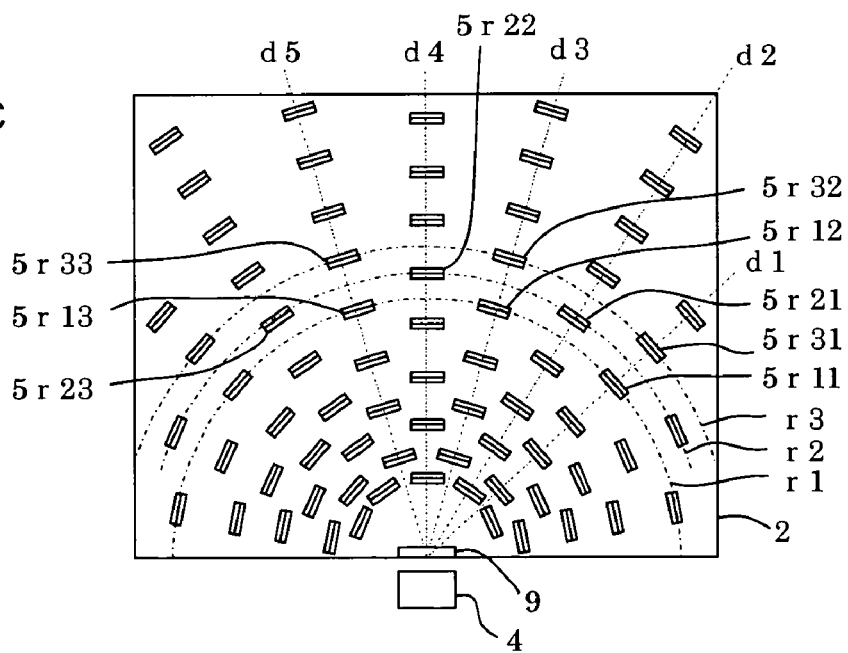

FIGS. 1A to 1C are schematic diagrams illustrating a lighting device 1 according to this embodiment. FIG. 1A is a sectional view of the lighting device 1. FIG. 1B is a perspective view of one reflecting part 5. FIG. 1C is a top view of a light guiding plate 2 of the lighting device 1. Identical components or components that have the same functions are denoted by the same reference symbols.

As illustrated in FIG. 1A, the light guiding plate 2 is shaped like a flat board having a light exit face (first main surface) and an opposed face (second main surface). A reflector 3 is set across from the opposed face of the light guiding plate 2, and a light source 4 is set to the side of the light guiding plate 2. Light that exits the light source 4 is introduced from a light entrance part 9, which is placed in the light guiding plate 2 to face the light source 4. The light entrance part 9 has a narrow area, and introduced light spreads inside the light guiding plate 2 radially from the light entrance part 9.

Each reflecting part 5 is a concave part formed on the opposed face of the light guiding plate 2, and a side face of the reflecting part 5 constitutes a reflecting surface 6. In FIG. 1B, the concave part has a substantially isosceles triangle shape in section, and one of the slopes of the concave part that is closer to the position where the light entrance part 9 is located functions as the reflecting surface 6. A line of intersection between the reflecting surface 6 and the opposed face of the light guiding plate 2 (intersection line 10) is substantially orthogonal to a direction in which the light entrance part 9 is located. Each reflecting part 5 has substantially the same shape in plan view, which is a substantially rectangular shape. The intersection line 10 constitutes the long axis of the rectangle.

The plurality of reflecting parts 5 are arranged in a staggered pattern in the circumferential direction of a circle having the light entrance part 9 as its center. The reflecting parts 5 are also arranged in a staggered pattern in a radius direction which is orthogonal to the circumferential direction of the circle having the light entrance part 9 as its center. This is described in detail with reference to FIG. 1C, with particular attention on regions of arcs r1 to r3 and radius direction lines d1 to d5. The rest has the same structure as that of these regions. The arcs r1, r2, and r3 are part of concentric circles having the light entrance part 9 as their center. On the arc r1, reflecting parts 5r11, 5r12, and 5r13 are placed spaced apart from one another. Placed on the arc r2 are reflecting parts 5r21, 5r22, and 5r23, which are spaced apart from one another. Placed on the arc r3 are reflecting parts 5r31, 5r32, and 5r33, which are spaced apart from one another. The reflecting parts 5r11 and 5r12 on the arc r1 are associated with the reflecting part 5r21 on the adjacent arc r2 by placing the reflecting part 5r21 between points on the arc r2 that correspond to the locations of the reflecting parts 5r11 and 5r12 on the arc r1. The reflecting parts 5r12 and 5r13 on the arc r1 are associated with the reflecting part 5r22 on the adjacent arc r2 by placing the reflecting part 5r22 between points on the arc r2 that correspond to the locations of the reflecting parts 5r12 and 5r13 on the arc ri. Similarly, the reflecting parts 5r21 and 5r22 on the arc r2 are associated with the reflecting part 5r32 on the adjacent arc r3 by placing the reflecting part 5r32 between points on the arc r3 that correspond to the locations of the reflecting parts 5r21 and 5r22 on the arc r2. The reflecting parts 5r22 and 5r23 on the arc r2 are associated with the reflecting part 5r33 on the adjacent arc r3 by placing the reflecting part 5r33 between points on the arc r3 that correspond to the locations of the reflecting parts 5r22 and 5r23 on the arc r2. In short, the reflecting parts 5 are arranged in the staggered pattern in the circumferential direction of adjacent arcs.

A similar arrangement is employed in the radius direction which is orthogonal to the circumferential direction. For example, along the radius direction line dl, the reflecting part 5r11 on the arc rl and the reflecting part 5r31 on the arc r3 are placed. Placed along the radius direction line d2, which is adjacent to the line dl, is the reflecting part 5r21 on the arc r2. Placed along the radius direction line d3, which is adjacent to the line d2, are the reflecting part 5r12 on the arc rl and the reflecting part 5r32 on the arc 3. Placed along the radius direction line d4, which is adjacent to the line d3, is the reflecting part 5r22 on the arc r2. Placed along the radius direction line d5, which is adjacent to the line d4, are the reflecting part 5r13 on the arc rl and the reflecting part 5r33 on the arc 3. In short, the reflecting parts 5 are arranged in a staggered pattern in the radius direction, too.

With the reflecting parts 5 arranged in this manner, light introduced to the interior of the light guiding plate 2 from the light entrance part 9 travels as follows. To take the radius direction line d3 as an example, the introduced light is cast onto the reflecting part 5r12 on the arc r1, and then cast onto the reflecting part 5r32 on the arc r3 next to the arc r2, because no reflecting part is placed at a point where the arc r2 meets the radius direction line d3. Accordingly, there is less chance of the reflecting part 5r32 being in the shadow of the reflecting part 5r12. To summarize, the area of the reflecting surface 6 of the reflecting part 5 that is not irradiated with light is reduced and light is reflected in a wide area. As a result, the luminance of light that exits the light exit face of the light guiding plate 2 rises and the controllability of the luminance distribution is improved, which makes it easier to design uniform illumination light.

The reflecting parts 5 do not always need to be arranged on arcs of concentric circles, as long as reflecting parts 5 are arranged in a staggered pattern in the circumferential direction. Similarly, the centers of the reflecting parts 5 do not need to be aligned with the radius direction line dl (or d2, or d3, or d4, or d5), as long as the reflecting parts 5 are arranged in a staggered pattern also in the radius direction.

Second Embodiment

Figure 2:
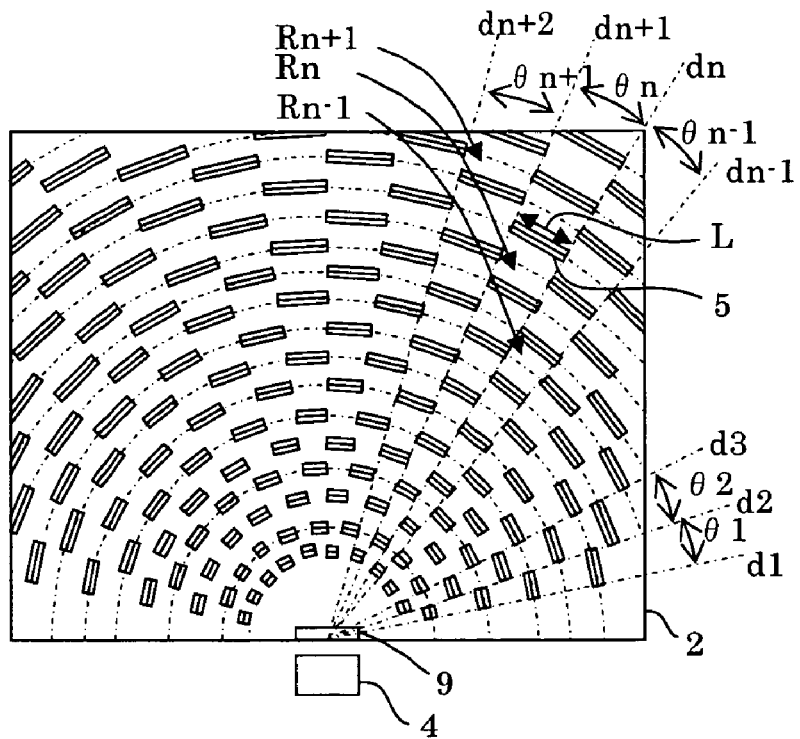
FIG. 2 is a schematic plan view of a light guiding plate that constitutes a lighting device according to an embodiment of the present invention.

FIG. 2 is a plan view of a lighting device 1 according to a second embodiment of the present invention. Identical components or components that have the same functions are denoted by the same reference symbols.

A large number of reflecting parts 5 are formed on an opposed face of a light guiding plate 2. A light source 4 is placed across from the midpoint of the lower side of the light guiding plate 2. A part of the light guiding plate 2 that faces the light source 4 constitutes a light entrance part 9. Each reflecting part 5 is a concave part formed on the opposed face of the light guiding plate 2. One of slopes of the concave part that is nearer to the light entrance part 9 constitutes a reflecting surface 6. The plurality of reflecting parts 5 are arranged in staggered pattern in the circumferential direction and radius direction of a circle having the light entrance part 9 as its center. The reflecting parts 5 each have a substantially rectangular shape in plan view, and the long axis of the rectangle is substantially orthogonal to a direction in which the light entrance part 9 is located.

On the plane of the light guiding plate 2, light travels radially from the light entrance part 9, and the directions of the light radiation divide a sector that has the light entrance part 9 as its center into small angles $\theta_1 \ldots \theta_{n-1}, \theta_n, \theta_{n+1} \ldots$. For example, a region Rn defined by the small angle $\theta_n$ borders a region Rn−1 and a region Rn+1 respectively along a line dn and a line dn+1, which run radially from the light entrance part 9. A long axis L of any reflecting part 5 that is contained in the region Rn is generally $r \cdot \sin \theta$ at a distance r from the light entrance part 9. This length is used as a reference length for all the reflecting parts 5. The long axis L of each reflecting part 5 therefore becomes longer as the distance r from the light entrance part 9 grows. In other words, as the distance r becomes greater, the reflecting surface 6 of the reflecting part 5 increases in area. The luminance distribution of illumination light that exits a light exit face of the light guiding plate 2 is thus made uniform.

The small angles $\theta_1 \ldots \theta_{n-1}, \theta_n, \theta_{n+1} \ldots$ may be set to an equal angle or different angles. For example, the luminance distribution of illumination light that exits the light exit face of the light guiding plate 2 may be made uniform by setting the small angle $\theta_n$ relatively small in a direction perpendicular to the lower side where the light entrance part 9 is located, and by increasing the small angle $\theta_n$ gradually as the tilt from the perpendicular direction increases.

Third Embodiment

Figure 3:
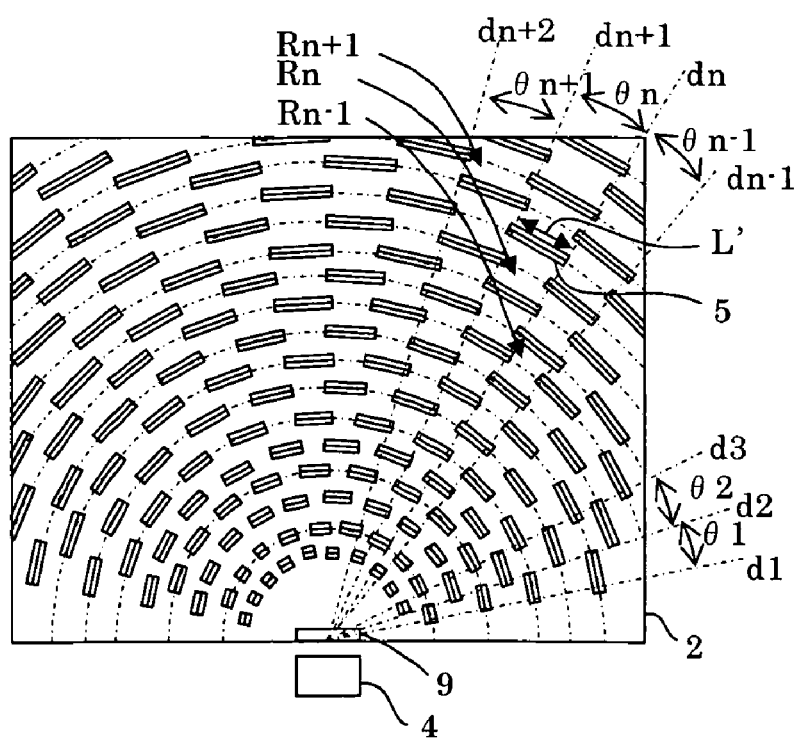
FIG. 3 is a schematic plan view of a light guiding plate that constitutes a lighting device according to an embodiment of the present invention.

FIG. 3 is a schematic plan view of a lighting device 1 according to a third embodiment of the present invention. Identical components or components that have the same functions are denoted by the same reference symbols.

A large number of reflecting parts 5 are formed on an opposed face of a light guiding plate 2. A light source 4 is placed across from the midpoint of the lower side of the light guiding plate 2. A part of the light guiding plate 2 that faces the light source 4 constitutes a light entrance part 9, which introduces light from the light source 4 to the interior of the light guiding plate 2. Each reflecting part 5 is a concave part formed on the opposed face of the light guiding plate 2. One of slopes of the concave part that is nearer to the light entrance part 9 constitutes a reflecting surface 6. The plurality of reflecting parts 5 are formed in staggered pattern in the circumferential direction and radius direction of a circle having the light entrance part 9 as its center. The reflecting parts 5 each have a substantially rectangular shape in plan view, and the long axis of the rectangle is substantially orthogonal to a direction in which the light entrance part 9 is located.

A sector having the light entrance part 9 as its center is divided in the circumferential direction into small angles $\theta_1 \ldots \theta_{n-1}, \theta_n, \theta_{n+1} \ldots$. For example, in a region Rn which is defined by the small angle $\theta_n$, a long axis L' of the reflecting part 5 that is contained in the region Rn at a distance r from the light entrance part 9 is larger than a reference length L ($=r \cdot \sin \theta$). Also, each reflecting part 5 in the region Rn stretches across a line dn and a line dn+1, which run radially from the light entrance part 9 and define the region Rn. In other words, one reflecting part 5 partially overlaps with another reflecting part 5 that is adjacent to the one reflecting part 5 in the radius direction of the circle having the light entrance part 9 as its center.

In the case where the reflecting parts 5 that are adjacent to each other in the radius direction of the circle having the light entrance part 9 as its center do not overlap with each other, no reflecting surface is formed along, for example, the radius direction lines dn and dn+1, and these lines may be observed as dark lines where illumination light is lost. Dark lines can be prevented by overlapping the reflecting parts 5 in the radius direction in the manner described above. In the third embodiment, too, the small angle $\theta_n$ does not need to be an angle obtained by equally dividing the central angle of an arc that has the light entrance part 9 as its center. For example, the luminance distribution of illumination light that exits the light exit face of the light guiding plate 2 may be made uniform by setting the small angle $\theta_n$ relatively small in a direction perpendicular to the lower side where the light entrance part 9 is located, and by increasing the small angle $\theta_n$ gradually as the tilt from the perpendicular direction increases.

Fourth Embodiment

Figure 4:
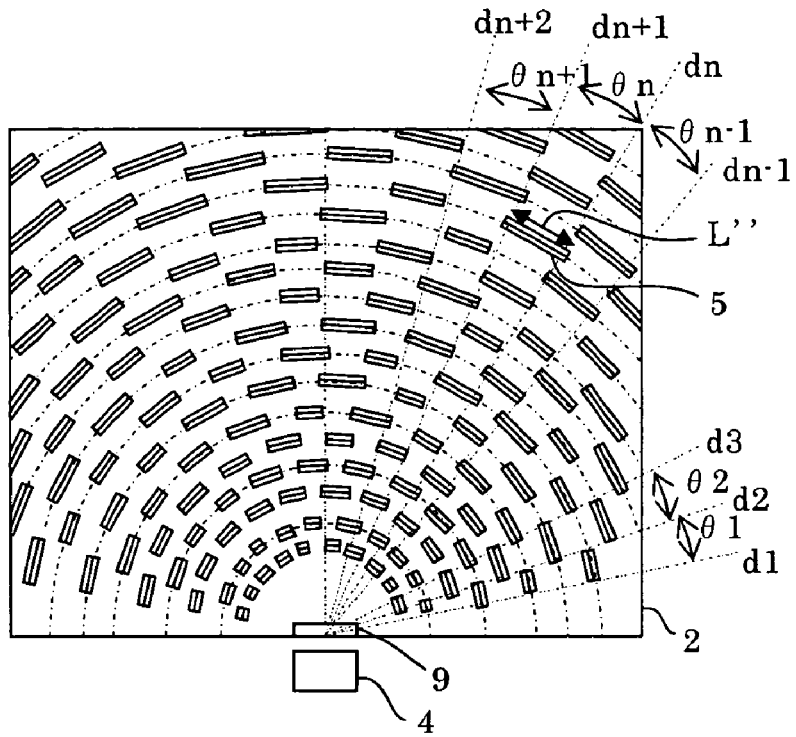
FIG. 4 is a schematic plan view of a light guiding plate that constitutes a lighting device according to an embodiment of the present invention.

FIG. 4 is a schematic plan view of a lighting device 1 according to a fourth embodiment of the present invention. Identical components or components that have the same functions are denoted by the same reference symbols.

A large number of reflecting parts 5 are formed on an opposed face of a light guiding plate 2. A light source 4 is placed across from the midpoint of the lower side of the light guiding plate 2. A part of the light guiding plate 2 that faces the light source 4 constitutes a light entrance part 9, which introduces light from the light source 4 to the interior of the light guiding plate 2. Each reflecting part 5 is a concave part formed on the opposed face of the light guiding plate 2. One of slopes of the concave part that is nearer to the light entrance part 9 constitutes a reflecting surface 6. The plurality of reflecting parts 5 are formed in staggered pattern in the circumferential direction and radius direction of a circle having the light entrance part 9 as its center. The reflecting parts 5 each have a substantially rectangular shape in plan view, and the long axis of the rectangle is substantially orthogonal to a direction in which the light entrance part 9 is located.

A sector having the light entrance part 9 as its center is divided in the circumferential direction into small angles $\theta1 \ldots \theta n-1, \theta n, \theta n+1 \ldots$. For example, in a region Rn which is defined by the small angle $\theta n$, a long axis L" of the reflecting part 5 that is contained in the region Rn at a distance r from the light entrance part 9 is set randomly within a range of from 0.8 times to 1.2 times a reference length L (=r·sin $\theta$). Therefore, some reflecting parts 5 in the region Rn stretch across a line dn and a line dn+1, which run radially from the light entrance part 9 and define the region Rn, whereas other reflecting parts 5 in the region Rn stay within the region Rn. Setting the long axes of the reflecting parts 5 in this manner prevents the lighting device 1 from being dark in some places and bright in other places along the border between Rn and Rn+1.

Fifth Embodiment

Figure 5A:
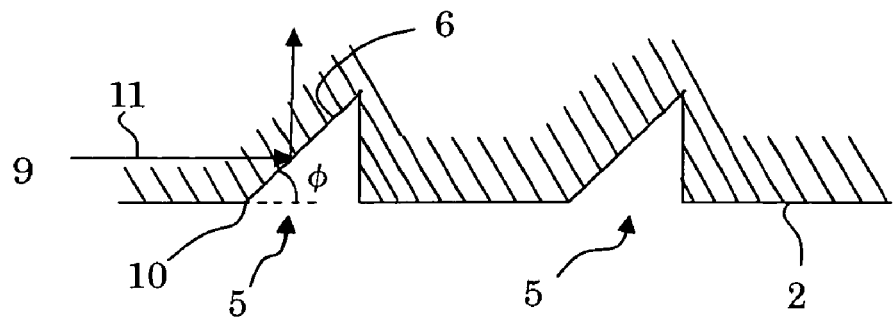
FIGS. 5A and 5B are explanatory diagrams of a light guiding plate that constitutes a lighting device according to an embodiment of the present invention.
Figure 5B:
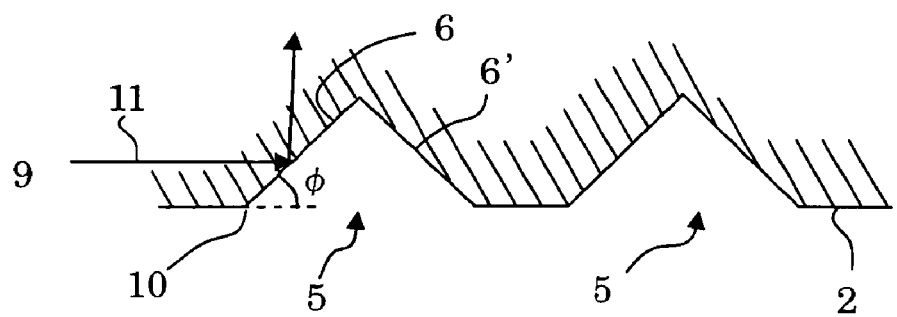

FIGS. 5A and 5B are schematic partial sectional views of a light guiding plate 2 that constitutes a lighting device 1 according to a fifth embodiment of the present invention. In particular, FIGS. 5A and 5B illustrate a shape of a reflecting part 5 in cross section cut parallel to a plane that is orthogonal to an intersection line 10 of the reflecting part 5. FIG. 5A is of a case where the sectional shape is substantially a right-angled triangle, and FIG. 5B is of a case where the sectional shape is substantially an isosceles triangle. Identical components or components that have the same functions are denoted by the same reference numerals and symbols.

In FIG. 5A, the reflecting part 5 which is a concave part formed on an opposed face of the light guiding plate 2 has a reflecting surface 6 on a face nearer to a light entrance part 9. A face of the reflecting part 5 that is farther from the light entrance part 9 is perpendicular to the opposed face. The intersection line 10 along which the plane of the opposed face of the light guiding plate 2 and the reflecting surface 6 intersect each other is substantially at right angles with respect to a direction in which the light entrance part 9 is located. Light 11 introduced from the light entrance part 9 is reflected at the reflection surface 6 and exits from a light exit face of the light guiding plate 2. The face of the reflecting part 5 that is farther from the light entrance part 9 is a vertical plane, and thus reflected light that is reflected by a reflector 3 is obstructed in a reduced area, which enables the lighting device 1 to provide illumination light having an improved luminance. An angle $\theta$ between the opposed face of the light guiding plate 2 and the reflecting surface 6 is set to 30° to 60°. This improves the utilization ratio of illumination light when the lighting device 1 is applied to, for example, a liquid crystal display device. The angle $\theta$ is preferably set in a range between 40° and 50°.

In FIG. 5B, the reflecting part 5 which is a concave part formed on an opposed face of the light guiding plate 2 is shaped like an isosceles triangle in cross section. Of slopes of the isosceles triangle, one that is nearer to the light entrance part 9 constitutes the reflecting surface 6 and one that is farther from the light entrance part 9 constitutes a reflecting surface 6'. The intersection line 10 along which the plane of the opposed face of the light guiding plate 2 and the reflecting surface 6 intersect each other is substantially at right angles with respect to a direction in which the light entrance part 9 is located. The light 11 introduced from the light entrance part 9 is reflected at the reflection surface 6 and exits from the light exit face of the light guiding plate 2. The angle $\theta$ between the opposed face of the light guiding plate 2 and the reflecting surface 6 is set to 30° to 60°. Preferably, the angle $\theta$ is set in a range between 40° and 50°. The reflecting part 5 may be formed on the light exit face of the light guiding plate 2 instead.

Sixth Embodiment

Figure 6A:
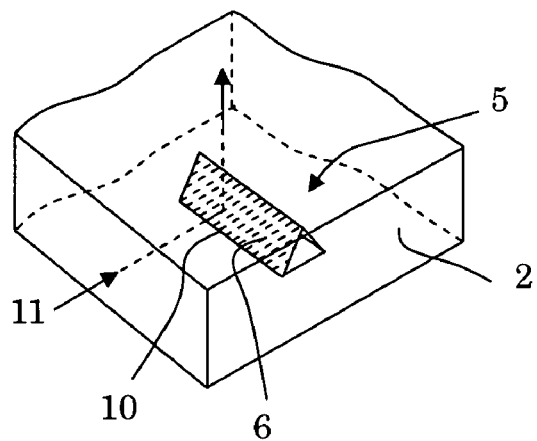
FIGS. 6A and 6B are schematic perspective views of a light guiding plate that constitutes a lighting device according to an embodiment of the present invention.
Figure 6B:
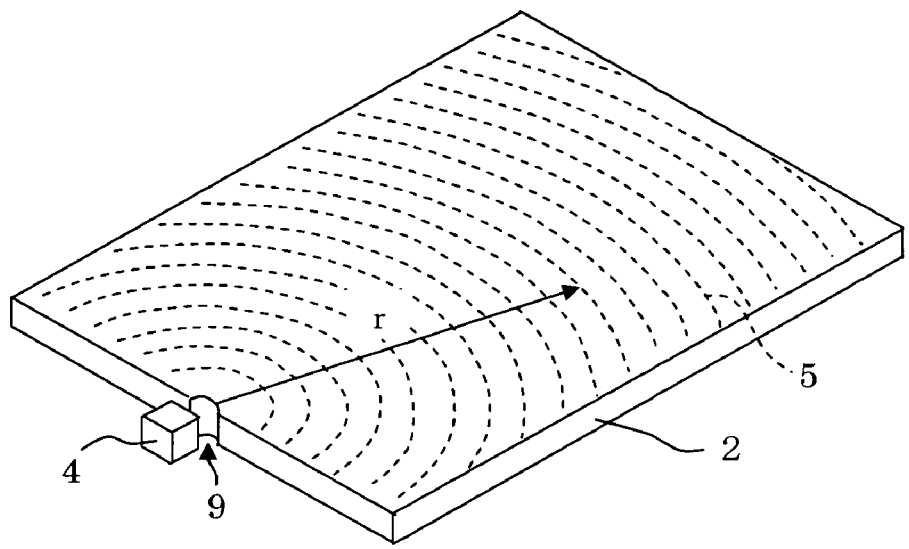

FIGS. 6A and 6B are schematic diagrams illustrating a lighting device 1 according to a sixth embodiment of the present invention. FIG. 6A is a schematic perspective view of a reflection part 5 formed on an opposed face of a light guiding plate 2, and FIG. 6B is a schematic perspective view of a light source 4 and the light guiding plate 2. Identical components or components that have the same functions are denoted by the same reference numerals.

In FIG. 6A, a concave part as the reflecting part 5 is formed on the opposed face of the light guiding plate 2. A reflecting surface 6 is formed on a side face of the reflecting part 5 to reflect light 11, which travels from a light entrance part 9, in a direction of a light exit face of the light guiding plate 2. The reflecting part 5 is placed such that an intersection line 10 along which the opposed face of the light guiding plate 2 and the reflecting surface 6 intersect each other is substantially at right angles with respect to a direction in which the light entrance part 9 is located.

In FIG. 6B, the light entrance part 9 is provided at the midpoint of one side of the light guiding plate 2. The light entrance part 9 introduces light of the light source 4, which faces the light entrance part 9, to the interior of the light guiding plate 2. When a distance from the light entrance part 9 to the reflecting part 5 is given as r, the reflecting part 5 is formed such that the reflecting surface 6 increases in area, or the total area of the reflecting surfaces 6 per unit area of the light exit face or the opposed face of the light guiding plate 2 increases, as the distance r becomes longer. This compensates for the weakening of the light introduced from the light entrance part 9 which is observed as the distance from the light entrance part 9 grows. As a result, illumination light that exits the light exit face of the light guiding plate 2 can have a uniform luminance.

Figure 7:
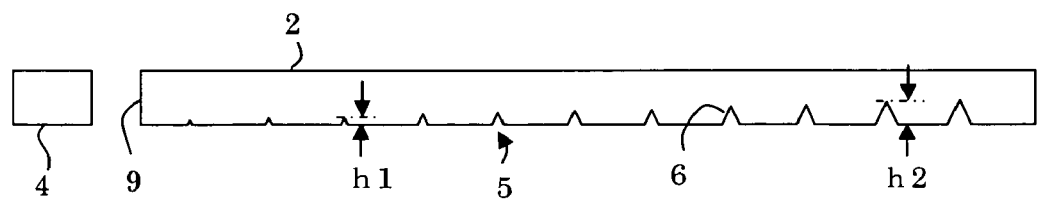
FIG. 7 is a schematic sectional view of a light guiding plate that constitutes the lighting device according to the embodiment of the present invention.
Figure 8:
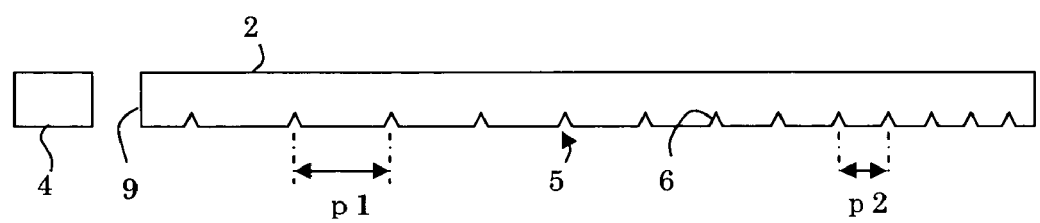
FIG. 8 is a schematic sectional view of a light guiding plate that constitutes the lighting device according to the embodiment of the present invention.

A specific description is given with reference to FIGS. 7 and 8. FIGS. 7 and 8 are schematic sectional views of the light guiding plate 2 constituting the lighting device 1 of the present invention. Identical components or components that have the same functions are denoted by the same reference numerals.

In FIG. 7, the reflecting parts 5 are formed on the opposed face of the light guiding plate 2. The light source 4 is placed to the left of the light guiding plate 2, and light emitted from the light source 4 is introduced through the light entrance part 9. Each reflecting part 5 is a concave part that has the shape of an isosceles triangle in cross section. One of the slopes of the isosceles triangle that is nearer to the light entrance part 9 constitutes the reflecting surface 6. When a depth of the reflecting surface 6 is given as h, the depth h is increased as the distance from the light entrance part 9 to the reflecting part 5 becomes greater, whereby the reflecting surface 6 increases in area. Specifically, a depth h1 of the reflecting surface 6 that is positioned nearer to the light entrance part 9 is set smaller than a depth h2 of the reflecting surface 6 that is positioned farther from the light entrance part 9. This compensates for the lowering of the luminance of illumination light that exits the light exit face of the light guiding plate 2 due to the weakening of the light introduced into the light guiding plate 2 which is observed as the distance from the light entrance part 9 grows. Uniform illumination light is thus obtained. Alternatively, every reflecting part 5 may have the same depth h while a length of the reflecting part 5 in a direction perpendicular to the surface of the sheet of paper on which FIG. 7 is drawn, in other words, a length of the intersection line 10 along which the reflecting surface 6 and the opposed face intersect each other, is increased as the distance from the light entrance part 9 becomes greater. When the number of the reflecting parts 5 per unit area of the light exit face or the opposed face of the light guiding plate 2 is the same, increasing the depth h of the reflecting surface 6, or the length of the intersection line 10, equals increasing the total area of the reflecting surfaces 6 in the unit area.

In FIG. 8, the reflecting parts 5 are formed on the opposed face of the light guiding plate 2. The light source 4 is placed to the left of the light guiding plate 2, and light emitted from the light source 4 is introduced through the light entrance part 9. Each reflecting part 5 of FIG. 8 is, as illustrated in FIG. 7, a concave part that has the shape of an isosceles triangle in cross section. A pitch p between one reflecting part 5 and its adjacent reflecting part 5 decreases as the distance from the light entrance part 9 becomes greater. Specifically, a pitch p1 between the reflecting parts 5 that are positioned nearer to the light entrance part 9 is larger than a pitch p2 between the reflecting parts 5 that are positioned farther from the light entrance part 9. When the reflecting surface 6 of each reflecting part 5 has the same area, the total area of the reflecting surfaces 6 per unit area of the opposed face of the light guiding plate 2 increases as the distance from the light entrance part 9 becomes longer. Alternatively, the pitch p between the reflecting parts 5 may be constant while a pitch between the reflecting parts 5 in a direction perpendicular to the surface of the sheet of paper on which FIG. 8 is drawn is narrowed as the distance from the light entrance part 9 becomes longer. The above-mentioned description also applies to a case where the reflecting parts 5 are formed on the light exit face of the light guiding plate 2 instead.

Seventh Embodiment

Figure 9:
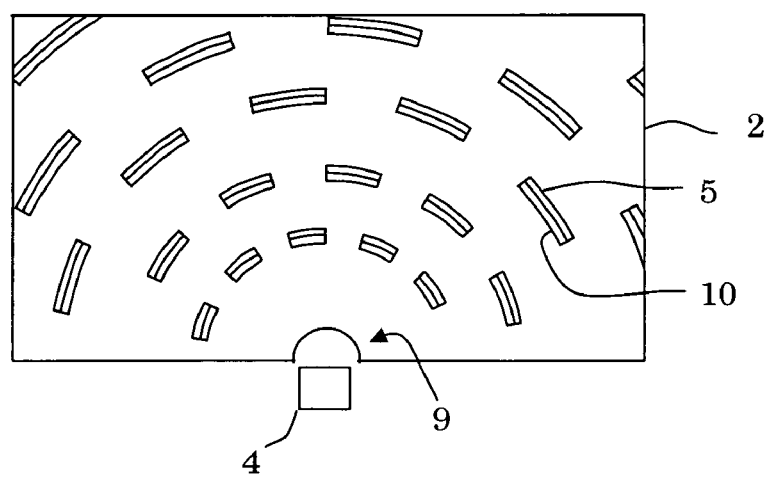
FIG. 9 is a schematic partial top view of a light guiding plate that constitutes a lighting device according to an embodiment of the present invention.

FIG. 9 is a schematic top view of a light guiding plate 2 of a lighting device 1 according to a seventh embodiment of the present invention. Identical components or components that have the same functions are denoted by the same reference numerals.

As illustrated in FIG. 9, a light entrance part 9 is formed to face a light source 4, and a large number of concave parts are formed around the light entrance part 9 as reflecting parts 5, which substantially have the shape of a right-angled triangle or an isosceles triangle, for example, in cross section. The reflecting parts 5 are arranged in staggered pattern in a circumferential direction and a radius direction orthogonal to the circumferential direction. A line of intersection between a reflecting surface 6 of each reflecting part 5 and an opposed face of the light guiding plate 2 (intersection line 10) is shaped like an arc having the light entrance part 9 as its center. This makes the intersection line 10 of the reflecting surface 6 orthogonal to the direction of the light entrance part 9 in any place, and enables the reflecting parts 5, even when formed large, to align a direction of reflected light. The reflecting parts 5 do not always need to be placed on the circumference of a circle having the light entrance part 9 as its center. In short, the reflecting parts 5 only need to be arranged in staggered pattern in the circumferential direction and a radius direction orthogonal to the circumferential direction. A long axis, namely, the intersection line 10, of each reflecting part 5 may be arranged such that the reflecting parts 5 that are adjacent to each other in the radius direction partially overlap with each other. A length of the long axis of the reflecting part 5 that is placed at a given distance from the light entrance part 9 may be set randomly within a range of from 0.8 times to 1.2 times a reference line L, which is determined based on the given length, r. The reference length L is as described in the second embodiment.

Eighth Embodiment

Figure 10A:
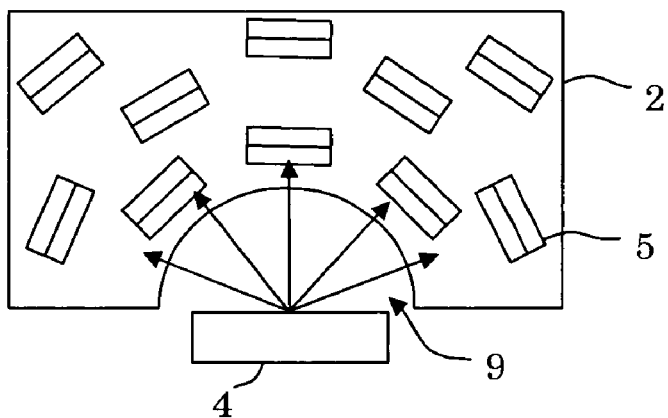
FIGS. 10A and 10B are schematic partial top views each illustrating a light guiding plate that constitutes a lighting device according to an embodiment of the present invention.
Figure 10B:
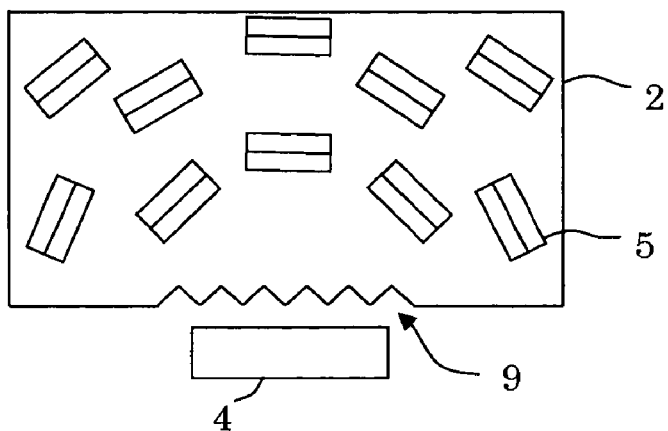

FIGS. 10A and 10B are schematic diagrams illustrating a light entrance part 9 of a lighting device 1 according to an eighth embodiment of the present invention. FIG. 10A is a partial top view of the light entrance part 9 of a light guiding plate 2. FIG. 10B is a partial top view illustrating another example of the light entrance part 9 of the light guiding plate 2. Identical components or components that have the same functions are denoted by the same reference numerals.

In FIG. 10A, a substantially semi-circular concave part is formed as the light entrance part 9 in an end face of the light guiding plate 2. A light source 4 is placed such that a light emission source or a light emission face of the light source 4 is positioned substantially at a center of the semi-circle and substantially level with the center in a thickness direction of the light guiding plate 2. A diameter of the substantially semi-circular concave part is set larger than the light emission source or the light emission face of the light source 4. For example, a light emitting diode (LED) is employed as the light source 4. Light emitted from the light source 4 is substantially perpendicular to the end face of the light entrance part 9, which is a substantially semi-circular concave part, upon incidence. In other words, the adverse effect of refraction upon incidence of light on the light guiding plate 2 is small, and light can be diffused to reach the left and right corners of the light guiding plate 2 along a side in which the light entrance part 9 is placed. The light emission face of the light source 4 may be placed at the center of the semi-circle of the light entrance part 9, or at a point between the center of the semi-circle and the light entrance part 9.

In FIG. 10B, a serrated concave part is formed as the light entrance part 9 in an end face of the light guiding plate 2. Light radiated from the light source 4 is introduced to the interior of the light guiding plate 2 by being scattered by the serrated light entrance part 9. The light can thus be diffused to reach the left and right corners of the light guiding plate 2 along the side in which the light entrance part 9 is placed.

In the embodiments described above, an LED can be employed as the light source 4. The light guiding plate 2 can use light-transmissive plastic materials such as acrylic (PMMA), polycarbonate (PC), and cycloolefin polymer (COP), or grass. The reflecting parts 5 formed on the opposed face of the light guiding plate 2 may be semi-circular, or may be U-shaped or semi-circular grooves other than the V-shaped grooves illustrated in FIG. 1A. The reflecting parts 5 may be formed on a light exit face of the light guiding plate 2 instead of the opposed face thereof. The reflecting parts 5 may be formed on the light exit face and the opposed face of the light guiding plate 2 both. In short, it is sufficient if the lighting device 1 has a reflecting structure capable of reflecting light in a direction perpendicular to the light exit face of the light guiding plate 2. The reflector 3 may be aboard-like reflecting plate or a film-like reflecting sheet. The reflector 3 may also be a reflecting film that is obtained by layering metal films of different refractive indices, such as an Ag film and an Al film, on the opposed face of the light guiding plate 2.

Figure 11:
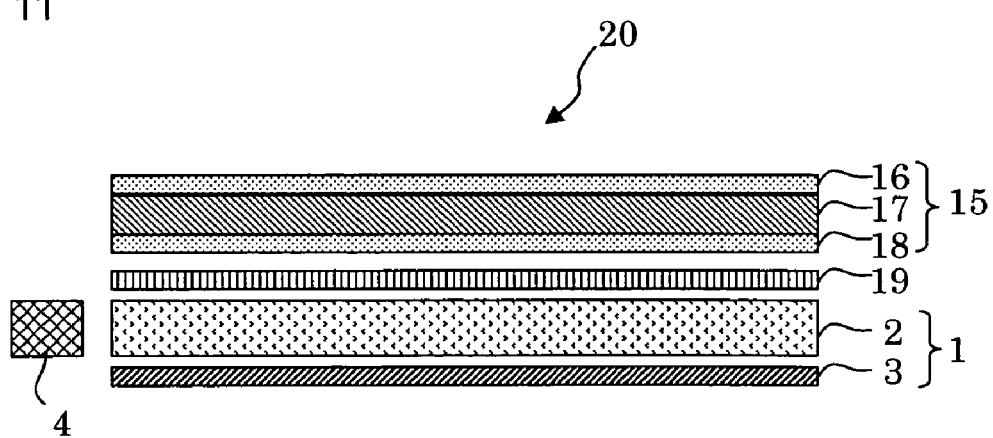
FIG. 11 is a schematic sectional view of a liquid crystal display device according to the embodiment of the present invention.
Figure 12:
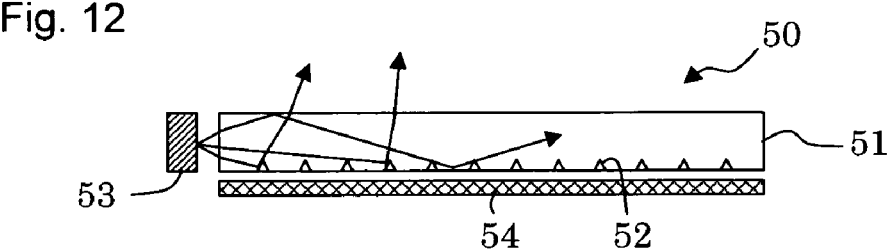
FIG. 12 is a schematic sectional view of a known conventional lighting device.
Figure 13:
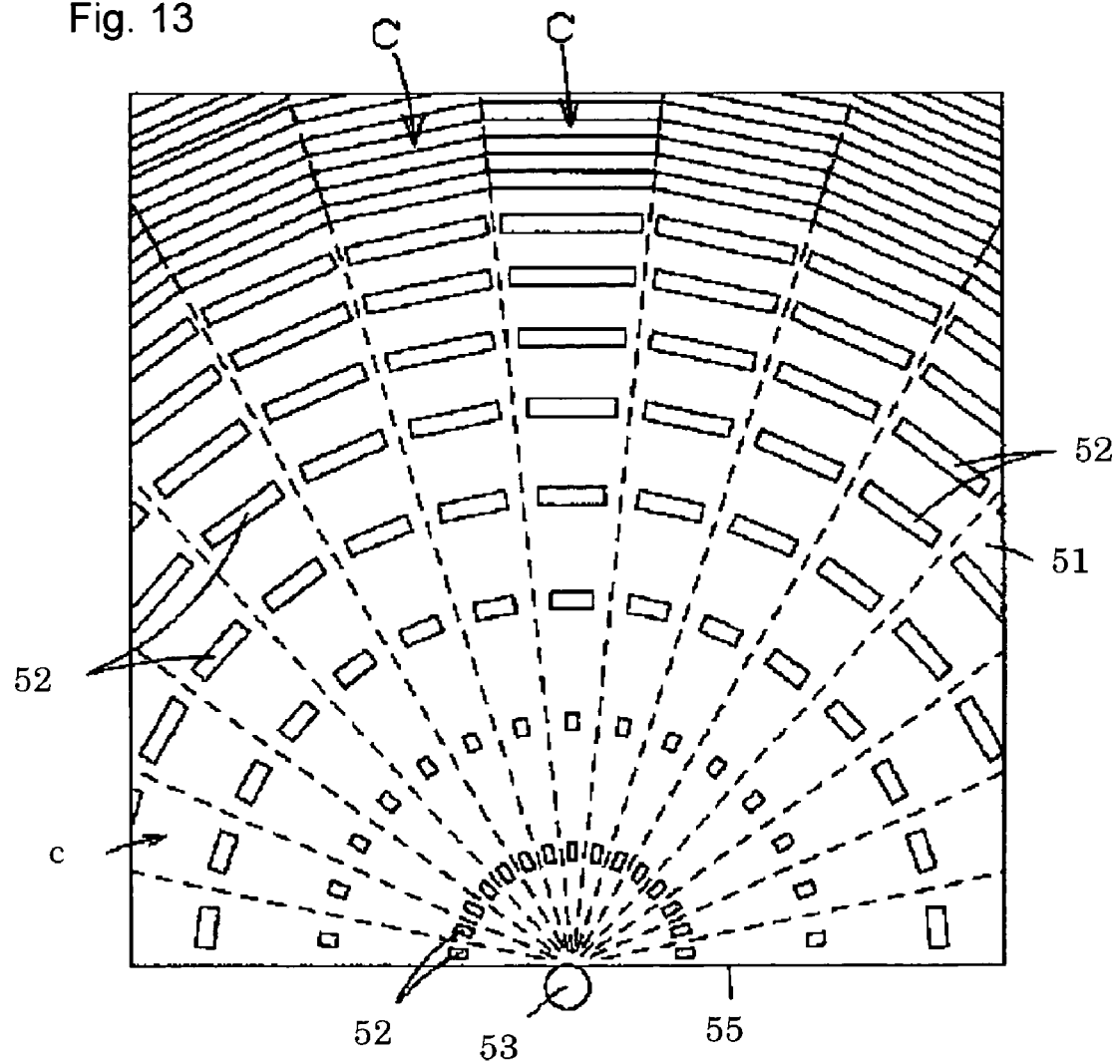
FIG. 13 is a schematic top view of the known conventional lighting device.
Figure 14:
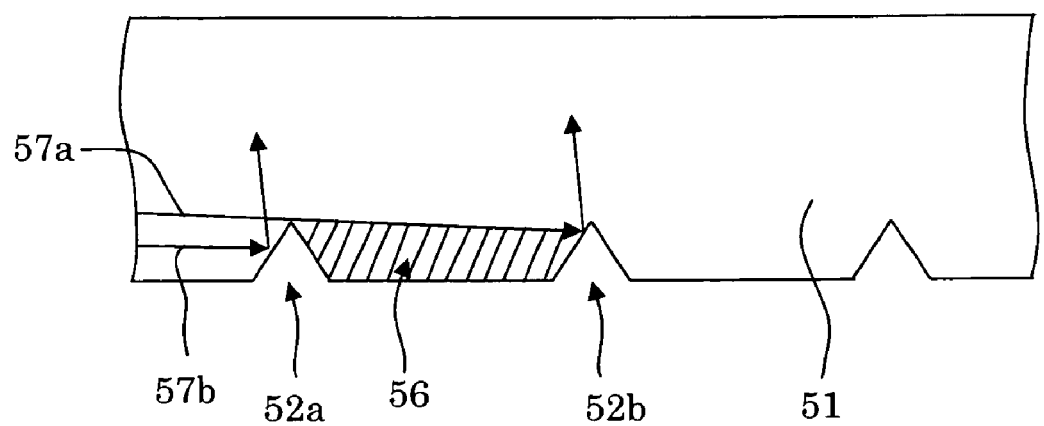
FIG. 14 is a schematic partial sectional view of the known conventional lighting device.

FIG. 11 is a schematic sectional view of a liquid crystal display device 20 according to an embodiment of the present invention. Identical components or components that have the same functions are denoted by the same reference numerals.

As illustrated in FIG. 11, the liquid crystal display 20 includes a liquid crystal display panel 15 and a lighting device 1. The liquid crystal display panel 15 includes a liquid crystal panel 17, an upper polarizing plate 16, and a lower polarizing plate 18. The liquid crystal panel 15 is formed of two glass substrates bonded together by a sealing agent, with a gap left between the glass substrates to contain a liquid crystal layer (not shown). The upper and lower polarizing plates 16 and 18 are attached to external faces of the liquid crystal panel 17. The lighting device 1 is placed below the liquid crystal display panel 15 to cast illumination light from the back of the liquid crystal display panel 15. The lighting device 1 includes a light guiding plate 2, a light source 4, which is placed to the side of the light guiding plate 2, and a reflector 3, which is placed on the back of the light guiding plate 2. The lighting device 1 is structured as described in the first to eighth embodiments. A light diffusing plate 19 is placed between the lighting device 1 and the liquid crystal display panel 15. If necessary, a prism sheet may be inserted between the light diffusing plate 19 and the liquid crystal display panel 15.

In the embodiments described above, the thickness of the light guiding plate 2 and the thickness of the light source 4 can be set to 0.3 mm to 1 mm. The lighting device 1 can therefore be shaped like a thin plate having a thickness on this order. The depth of concave parts functioning as the reflecting parts 5 can be set to 1 µm to 5 µm, and the interval between the concave parts can be set to 10 µm to 50 µm. Accordingly, the lighting device 1 can be made as thin as 0.3 mm to 1 mm, and hence the overall thickness of the liquid crystal display device 20 can be made significantly thin.

What is claimed is:

1. A lighting device, comprising:
   a light source;
   a light guiding plate having a light exit face, an opposed face opposite to the light exit face, a light entrance part that introduces light from the light source into the light guiding plate, and a plurality of reflecting parts formed on at least one of the light exit face and the opposed face for causing the introduced light to exit the light guiding plate from the light exit face; and
   a reflector disposed against the opposed face of the light guiding plate;
   wherein the plurality of reflecting parts are arranged on respective sets of arcs of concentric circles with each concentric circle having the light entrance part as its center, each of the plurality of reflecting parts having a long axis extending in a direction substantially orthogonal to a line connected between a center of the corresponding reflecting part and the center of the light entrance part;
   wherein for each of the sets of arcs of concentric circles, all of the reflecting parts are arranged at the same pitch; and
   wherein each of the plurality of reflecting parts arranged on one of the sets of arcs of concentric circles is positioned behind a space between two adjacent reflecting parts arranged on another of the sets of arcs of concentric circle adjacent to the one of the sets of concentric circles so as to partially overlap with each of the two adjacent reflecting parts.

2. A lighting device according to claim 1; wherein the long-axis of the each of the plurality of reflecting parts is set randomly within a range of from 0.8 times to 1.2 times a reference length, which is determined based on a distance from the light entrance part.

3. A lighting device according to claim 1; wherein each of the plurality of reflecting parts comprises a concave part.

4. A lighting device according to claim 3; wherein each of the plurality of reflecting parts is in the shape of one of a right-angled triangle and a substantially isosceles triangle with a base of the triangle corresponding to one of the light exit face and the opposed face; and wherein an angle between the base and one face of the each of the plurality of reflecting parts that is closest to the light entrance part is within a range of from 30° to 60°.

5. A lighting device according to claim 1; wherein each of the plurality of reflecting parts comprises a rectangular-shaped concave part.

6. A lighting device according to claim 5; wherein each of the plurality of reflecting parts is in the shape of one of a right-angled triangle and a substantially isosceles triangle with a base of the triangle corresponding to one of the light exit face and the opposed face; and wherein an angle between the base and one face of the each of the plurality of reflecting parts that is closest to the light entrance part is within a range of from 30° to 60°.

7. A lighting device according to claim 1; wherein the each of the plurality of reflecting parts comprises a reflecting surface slanted with respect to one of the light exit face and the opposed face; and wherein an area of the reflecting surface of each of the plurality of reflecting parts increases as a distance from the light entrance part to the each of the plurality of reflecting parts becomes greater.

8. A lighting device according to claim 7; wherein each of the plurality of reflecting parts comprises a concave part formed on one of the light exit face and the opposed face; and wherein for each of the reflecting parts, a depth of the concave part from a plane of the one of the light exit face and the opposed face increases as the distance from the light entrance part to the each of the plurality of reflecting parts becomes greater.

9. A lighting device according to claim 7; wherein each of the plurality of reflecting parts comprises a concave part formed on one of the light exit face and the opposed face; and wherein a length of the each of the plurality of reflecting parts in the circumferential direction increases as the distance from the light entrance part to the each of the plurality of reflecting parts becomes greater.

10. A lighting device according to claim 7; wherein the plurality of reflecting parts are formed cyclically in the radius direction of the circle having the light entrance part as its center; and wherein a pitch between the plurality of reflecting parts in the radius direction becomes narrower as the distance from the light entrance part to each of the plurality of reflecting parts becomes greater.

11. A lighting device according to claim 1; wherein each of the plurality of reflecting parts comprises a reflecting surface slanted with respect to one of the light exit face and the opposed face; and wherein a total area of the reflecting surfaces per unit area of the one of the light exit face and the opposed face increases as a distance from the light entrance part to the each of the plurality of reflecting parts becomes greater.

12. A lighting device according to claim 11; wherein each of the plurality of reflecting parts comprises a concave part formed on one of the light exit face and the opposed face; and wherein for each of the reflecting parts, a depth of the concave part from a plane of the one of the light exit face and the opposed face increases as the distance from the light entrance part to the each of the plurality of reflecting parts becomes greater.

13. A lighting device according to claim 11; wherein each of the plurality of reflecting parts comprises a concave part formed on one of the light exit face and the opposed face; and wherein a length of the each of the plurality of reflecting parts in the circumferential direction increases as the distance from the light entrance part to the each of the plurality of reflecting parts becomes greater.

14. A lighting device according to claim 11; wherein the plurality of reflecting parts are formed cyclically in the radius direction of the circle having the light entrance part as its center; and wherein a pitch between the plurality of reflecting parts in the radius direction becomes narrower as the distance from the light entrance part to each of the plurality of reflecting parts becomes greater.

15. A lighting device according to claim 1; wherein the light entrance part comprises a substantially semi-circular recess in a side face of the light guiding plate that faces the light source.

16. A liquid crystal display device comprising:
a lighting device comprising a light source; a light guiding plate having a light exit face, an opposed face opposite to the light exit face, a light entrance part that introduces light from the light source into the light guiding plate, and a plurality of reflecting parts formed on at least one of the light exit face and the opposed face for causing the introduced light to exit the light guiding plate from the light exit face; and a reflector disposed against the opposed face of the light guiding plate; and
a liquid crystal panel confronting the light exit face of the light guiding plate;
wherein the plurality of reflecting parts are arranged on respective sets of arcs of concentric circles with each concentric circle having the light entrance part as its center, each of the plurality of reflecting parts having a long axis extending in a direction substantially orthogonal to a line connected between a center of the corresponding reflecting part and the center of the light entrance part;
wherein for each of the seta of arcs of concentric circles, all of the reflecting parts are arranged at the same pitch; and
wherein each of the plurality of reflecting parts arranged on one of the sets of arcs of concentric circles is positioned behind a space between two adjacent reflecting parts arranged on another of the sets of arcs of concentric circle adjacent to the one of the sets of concentric circles so as to partially overlap with each of the two adjacent reflecting parts.

17. A lighting device comprising:
a light source;
a light guiding plate having a first main surface, a second main surface opposite the first main surface, a light entrance part that introduces light from the light source into the light guiding plate, and a plurality of reflecting parts formed on one of the first and second main surfaces for reflecting light introduced into the light guiding plate toward the first main surface, the plurality of reflecting parts being arranged on respective sets of arcs of concentric circles with each concentric circle having the light entrance part as its center, wherein each of the plurality of reflecting parts has a long axis extending in a direction substantially orthogonal to a line connected between a center of the corresponding reflecting part and the center of the light entrance part, wherein for each of the sets of arcs of concentric circles, all of the reflecting parts are arranged at the same pitch, and wherein each of the plurality of reflecting parts arranged on one of the sets of arcs of concentric circles is positioned behind a space between two adjacent reflecting parts arranged on another of the sets of arcs of concentric circle adjacent to the one of the sets of concentric circles so as to partially overlap with each of the two adjacent reflecting parts; and
a reflector confronting the second main surface of the light guiding plate.

18. A lighting device according to claim 17; wherein the long axis of the each of the plurality of reflecting parts is set randomly within a range of from 0.8 times to 1.2 times a reference length, which is determined based on a distance from the light entrance part.

19. A lighting device according to claim 17; wherein the light source confronts a side face of the light guiding plate; and wherein the light entrance part comprises a substantially semi-circular recess formed in the side face of the light guiding plate.

20. A liquid crystal display device comprising:
a lighting device according to claim 17; and
a liquid crystal panel confronting the first main surface of the light guiding plate of the lighting device.

* * * * *